United States Patent
Pirttimaa et al.

(10) Patent No.: US 7,574,735 B2
(45) Date of Patent: Aug. 11, 2009

(54) METHOD AND NETWORK ELEMENT FOR PROVIDING SECURE ACCESS TO A PACKET DATA NETWORK

(75) Inventors: Tarja Pirttimaa, Oulu (FI); Jyrki Polet, Oulu (FI)

(73) Assignee: Nokia Corporation, Espoo (FI)

( * ) Notice: Subject to any disclaimer, the term of this patent is extended or adjusted under 35 U.S.C. 154(b) by 1414 days.

(21) Appl. No.: 10/073,216

(22) Filed: Feb. 13, 2002

(65) Prior Publication Data

US 2003/0154400 A1    Aug. 14, 2003

(51) Int. Cl.
*G06F 9/00* (2006.01)
(52) U.S. Cl. .............................. 726/13; 726/11; 726/14
(58) Field of Classification Search .................... 726/13
See application file for complete search history.

(56) References Cited

U.S. PATENT DOCUMENTS 6,621,793 B2 * 9/2003 Widegren et al. ........ 370/230.1
6,996,087 B2 * 2/2006 Ejzak ........................ 370/338
7,002,936 B2 * 2/2006 Agrawal et al. ............. 370/329
2004/0252683 A1 * 12/2004 Kennedy et al. ............ 370/389

* cited by examiner

*Primary Examiner*—Pramila Parthasarathy
(74) *Attorney, Agent, or Firm*—Squire, Sanders & Dempsey L.L.P.

(57) ABSTRACT

The present invention relates to a method and network element for providing secure access to a packet data network, wherein a first source information is derived from a message received from a terminal device (40, 60), and is compared with a second source information derived from a packet data unit used for conveying said message, or derived from a security association set up between the terminal device and the data network. A protection processing for protecting the packet data network from a fraudulent user attack is then initiated based on the comparing result. Thereby, a simple and efficient protection mechanism can be provided without sending any additional information or providing any additional fields in the message.

28 Claims, 3 Drawing Sheets

METHOD AND NETWORK ELEMENT FOR PROVIDING SECURE ACCESS TO A PACKET DATA NETWORK

FIELD OF THE INVENTION

The present invention relates to a method and system for providing secure access to a packet data network such as an Internet Protocol (IP) multimedia subsystem (IMS) core network.

BACKGROUND OF THE INVENTION

In order to achieve access independence and to maintain a smooth interoperation with wired terminals across the Internet, the IMS as specified e.g. in the 3GPP ($3^{rd}$ Generation Partnership Project) specification PS 23.228 has been developed to be conformant to IETF (Internet Engineering Task Force) "Internet Standards". The IP multimedia core network (IM CN) subsystem enables network operators of mobile or cellular networks to offer their subscribers multimedia services based on and built upon Internet applications, services and protocols. The intention is to develop such services by mobile network operators and other $3^{rd}$ party suppliers including those in the Internet space using the mechanisms provided by the Internet and the IM CN subsystem. The IMS thus enables conversion of, and access to, voice, video, messaging, data and web-based technologies for wireless users, and combines the growth of the Internet with the growth in mobile communications.

FIG. 1 shows an architecture of an IMS network according to the above 3GPP specification. The architecture is based on the principle that the service control for home subscribed services for a roaming subscriber is in the home network HN, e.g. a Serving Call State Control Function (S-CSCF) 10 is located in the home network HN.

In general, the S-CSCF 10 performs the session control service for served terminal devices, e.g. mobile terminals or user equipments (UEs). It maintains a session state as needed by the network operator for support of the services. Within an operator's network, different S-CSCFs may have different functionalities. The functions performed by the S-CSCF 10 during a respective session are e.g. registration, session flow management, charging and resource utilization management. When a subscriber roams to a visited network VN, the visited network VN supports a Proxy-CSCF (P-CSCF) 30 which enables the session control to be passed to the S-CSCF 10 located at the home network HN and providing the service control. Furthermore, an Interrogating-CSCF (I-CSCF) 50 is provided in the home network HN as a contact point within the operators network for all connections destined to a subscriber of that network operator, or a roaming subscriber currently located within that network operator's service area. There maybe multiple I-CSCFs within an operator's network. The functions performed by the I-CSCF 50 include assigning an S-CSCF, e.g. the S-CSCF 10, to a user performing a registration procedure, routing a request received from another network towards an S-CSCF, obtaining the address of an S-CSCF from a subscriber data base, e.g. a Home Subscriber Server (HSS) 20 as shown in FIG. 1, and/or forwarding requests or responses to an S-CSCF determined based on the address obtained from the HSS 20.

The P-CSCF 30 is the first contact point within the IMS. Its address is discovered by a terminal device, e.g. a first terminal device (UE 1) 40 or a second terminal device (UE 2) 60 shown in FIG. 1, following a PDP (Packet Data Protocol) context activation. The P-CSCF 30 behaves like a proxy, i.e. it accepts requests and services them internally or forwards them on, possibly after translation. The P-CSCF 30 may also behave as a User Agent (UA), i.e. in abnormal conditions it may terminate and independently generate transactions. A UA is an interface between a user and a network application. For example, for web applications, the UA may be a browser. The functions performed by the P-CSCF 30 are forwarding register requests received from a UE to an I-CSCF, e.g. the I-CSCF 50, determined using the home domain name as provided by the respective UE, and forwarding requests or responses to the respective UE.

As regards the provision of a secure access to the IMS, the P-CSCF 30 is arranged to maintain a security association (SA) between itself and each UE, as defined in the 3GPP specification TS 33.203. Furthermore, the P-CSCF 30 provides security towards the S-CSCF 10 by security methods defined in the 3GPP specification TS 33.210.

Further details regarding the functions of the different CSCF elements shown in FIG. 1 can be gathered from the above mentioned 3GPP specifications.

A protocol used for exchanging messages in the IMS is the Session Initiation Protocol (SIP) as defined in the IETF specification RFC 2543. A SIP message is either a request from a client to a server, or a response from a server to a client. Both request and response messages use a generic message format specified in the IETF specification RFC 822 for transferring entities, i.e. the body of the message.

There are various identities that may be associated with a user of IP multimedia services. Every subscriber of the IMS has a private user identity (IM Private Identity (IMPI)) assigned by the home network operator, and used, for example, for registration, authorization, administration, and accounting purposes. However, the IMPI is not used for routing SIP messages. It is contained in all registration requests (including re-registration and de-registration requests) passed from a UE to the home network HN. The IMPI is securely stored at the UE and cannot be modified at the UE. The IMPI is used to identify the user's information stored within the HSS 20 and is authenticated only during registration of the subscriber. Thus, the HSS 20 and the S-CSCF 10 need to obtain and store the IMPI. Furthermore, a subscriber of the IMS may have one or more public user identities (IM Public Identities (IMPU)) which are used by any user for requesting communications to other users. These IMPUs may be included e.g. on a business card. Both telephone numbers and Internet naming schemes can be used to address users depending on their IMPUs. The IMPUs may take the form of a SIP URL (Uniform Resource Locator) or E.164 numbers. The IMPU may be used to identify the user's information within the HSS 20, for example during mobile terminated session setup.

SIP messages between a UE and the P-CSCF 30 are integrity protected. This integrity protection also provides message origin authentication. The authenticated origin may be identified by any identity to which an integrity key has been explicitly or implicitly bound in the registration procedure. These identities include the IMPI and the registered IMPUs. However, a fraudulent user may use an integrity key bound to a registered IMPU to generate a correct message authentication code on a SIP message, e.g. SIP INVITE, but include the IMPU of another subscriber in the SIP message. This would lead to a number of threats, e.g. the S-CSCF 10 would then charge the session to the wrong IMPU. As a result, UEs have the capability to send messages that appear to come from a particular UE but in fact come from another. The primary cause of this problem is due to the hop-by-hop security model combined with the lack of complete information either the P-CSCF 30 has on what is allowed in messages or the S-CSCF 10 has on where the message actually came from. Further details regarding the above fraudulent user attack can be gathered from the 3GPP specification TSG WG 3 Security S3-010633. The main problem arises from the fact that IMPUs may be invisibly registered. Hence, the P-CSCF 30 cannot bind integrity keys to those IMPUs.

Thus, the questions are which identities are bound to the integrity key transferred by a registration procedure message and how does the P-CSCF 30 inform the S-CSCF 10 about an identity bound to the integrity key used to verify the integrity of a message received from a user agent (UA) of a UE.

In the 3GPP specification TSG SA WG3 Security S3-010673, possible solutions to the above problems have been suggested. According to a first solution, the S-CSCF 10 sends the integrity key and all IMPUs for which a user is registered (explicitly or implicitly) to the P-CSCF 30 in the registration procedure message. Whenever the P-CSCF 30 later checks the integrity of a SIP message from a UE, using the integrity key, it checks whether any IMPU in the SIP message is one of those received with the integrity key in the registration procedure message. As an alternative, according to a second solution, when the P-CSCF 30 verifies a SIP message from the UE using the integrity key, it adds the IMPI received with the integrity key in the registration procedure message before forwarding the message to the S-CSCF 10. The S-CSCF 10 then checks whether the IMPI corresponds to the IMPU in the received message. Finally, according to a third solution, the UA of the UE adds the IMPI to the protected part of any integrity protected SIP message. The P-CSCF 30 then verifies the integrity of that message using the integrity key and checks whether the IMPI is one which was received with the integrity key in the registration procedure message. Again, the S-CSCF 10 then checks whether the IMPI corresponds to the IMPU in the received message.

However, according to the above suggested solutions, implicitly registered IMPU(s) are needed to be send to the P-CSCF 30 in the first solution. Furthermore, the P-CSCF 30 needs to know the IMPI in the second solution. To achieve this, additional fields might have to be added to the SIP messages. An additional field might also have to be added to the SIP message in the third solution. Thus, substantial modifications of the messages and signaling procedures are required.

SUMMARY OF THE INVENTION

It is therefore an object of the present invention to provide a method and network element, by means of which secure network access can be provided without using additional fields in the messages and without requiring the proxy server to know the private identity and implicitly registered public identities.

This object is achieved by a method for providing secure access to a packet data network, said method comprising:

receiving a message from a terminal device connected to said packet data network;

deriving a first source information from said message;

deriving a second source information;

comparing said first and second source information; and initiating a protection processing based on the result of said comparing step.

Preferably, the first source information is a source address information which may be derived from a header portion of said message. The second source information may be an address information which may be derived from a packet data unit used for conveying said message, or from a security association set up between said terminal device and said packet data network.

Additionally, the above object is achieved by a network element for providing secure access to a packet data network, said network element comprising:

receiving means for receiving a message from a terminal device connected to said network element;

deriving means for deriving a first source information from said message, and for deriving a second source information;

comparing means for comparing said first and second source information; and protecting means for initiating a protection processing based on the comparing result of said comparing means.

The deriving means may be arranged for deriving said first source information from the header portion of said message. Furthermore, the deriving means may be arranged for deriving the second source information from the packet data unit used for conveying said message or from the security association set up between said terminal device and said network element.

Accordingly, due to the fact that the comparison is based on information derived from the message itself or from a source information available at the concerned protection element of the network, there is no need for that network element to know the private identity or any implicitly registered public identity. Furthermore, no additional fields have to be added to the conveyed messages. Thereby, a simple solution to the above object can be provided.

Preferably, the protection processing may comprise a processing for dropping the message if the comparing step leads to the result that the first source information and the second source information do not indicate the same location, e.g. do not match or do not indicate the same addresses.

In particular, the first source information may be an IP address indicated in the message, e.g. in a header portion of the message which may be a SIP message. Furthermore, the second source information may be at least a part of a SIP source address of an IP datagram which may be transmitted using an IP security protocol, or may be an IP address bound to an integrity key of the security association. In the latter case, the IP address may be stored in a database of a proxy server provided for routing the message to the packet data network. In this case, the message may be conveyed using a SIP-level protection function.

The deriving means of the network element may be arranged to read the second source information from the database provided thereat. Alternatively, the deriving means may be arranged to derive the second source information by extracting the IP source address from the IP datagram.

BRIEF DESCRIPTION OF THE DRAWINGS

In the following, the present invention will be described in greater detail based on preferred embodiments with reference to the accompanying drawings in which.

DESCRIPTION OF THE PREFERRED EMBODIMENT

Figure 1:
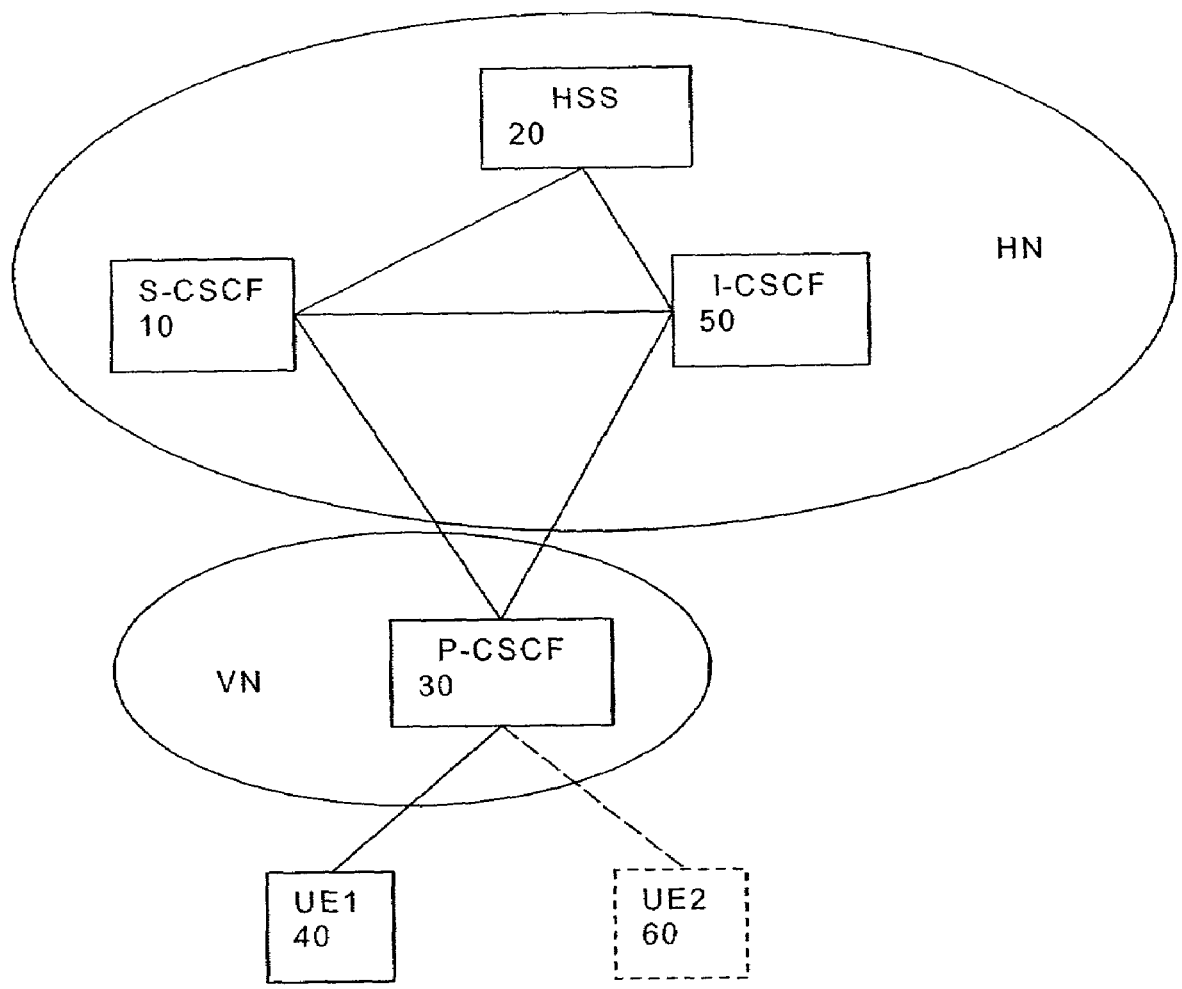
FIG. 1 shows a principle network architecture of an IMS architecture in which the present invention can be implemented.

The preferred embodiment will now be described on the basis of an IMS architecture as shown in FIG. 1.

As already mentioned, a hole for an attacker is provided in the system according to the 3GPP specification TS 33.203. Even if security transmission protocols, such as IP security (IPSec) or a SIP-level security or protection function (SIPSec), are used to protect the SIP signaling between a UA and the P-CSCF 30, an attacker who is also a subscriber in the IMS has a chance to send a SIP request message using the right SA for him and with a public identity (IMPU) which is not allocated to him. This is called a fraudulent user attack, i.e. identity spoofing. According to the preferred embodiments, mechanisms are provided to check whether an IMS subscriber uses only those IMPUs as IP messages, which are allocated to him. In FIG. 1, the UE2 60 indicated with dotted lines is assumed to perform a fraudulent user attack, using an IMPU of the UE1 40.

Figure 2:
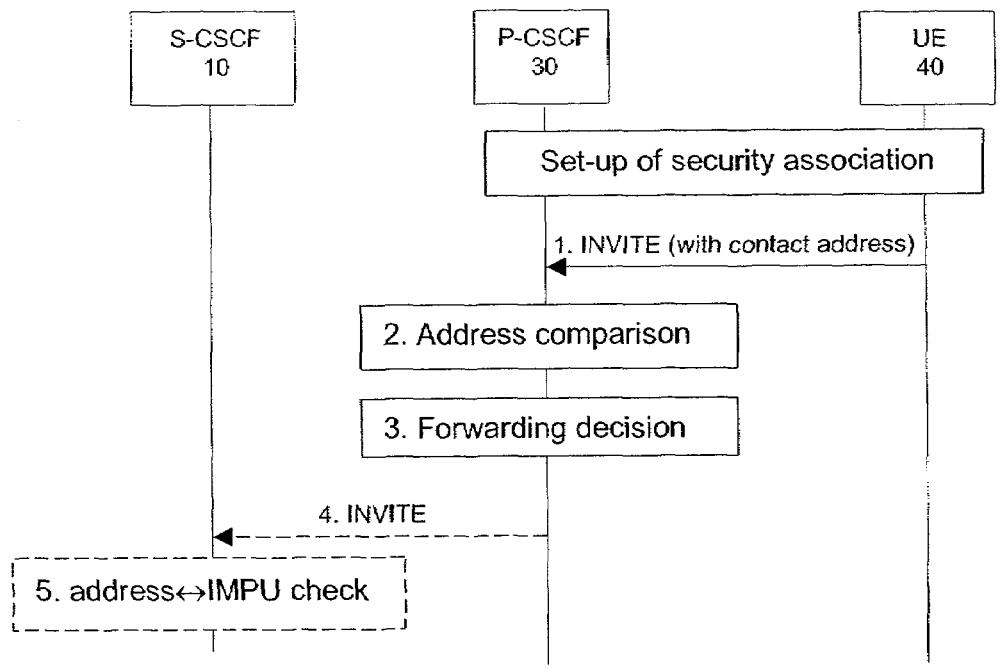
FIG. 2 shows a message and signaling processing diagram according to first and second preferred embodiments.

FIG. 2 shows a message signaling and processing diagram indicating the protection mechanism according to the preferred embodiments. Initially, a setup procedure for setting up a security association (SA) between the P-CSCF 30 and the UE1 40 is performed as specified in the 3GPP specification TS 33.203. The SA setup procedure is necessary in order to decide what security services are applied and when the security services start. For protecting IMS signaling between the UE1 40 and the P-CSCF 30, it is necessary to agree on shared keys provided by an IMS Authentication and Key Agreement (AKA) function, on certain protection methods (e.g. an integrity protection method) and a set of parameters specific to a protection method, e.g. the cryptographic algorithm to be used. The parameters negotiated are typically part of the SA to be used for a protection method. In particular, the UE1 40 and the P-CSCF 30 agree on an integrity key to be used for integrity protection. The mechanism is based on the IMS AKA. Then, the UE1 40 and the P-CSCF 30 both verify that received data or messages originate from a node which has the agreed integrity key. The identity used for authenticating a subscriber is the IMPI.

Only one SA is active between the UE1 40 and the P-CSCF 30. This single SA is updated when a new successful authenticated re-registration has occurred. Before a user can get access to the IM services at least one IMPU needs to be registered and the IMPI authenticated in the IMS at application level. In order to get registered, the UE1 40 sends a SIP REGISTER message towards the SIP registrar server, i.e. the S-CSCF 10, which will perform the authentication of the user. The P-CSCF 30 forwards the SIP REGISTER message towards the S-CSCF 10 and adds a Via header with its address included. Upon receiving the SIP REGISTER message the S-CSCF 10 needs one authentication vector (AV). Based on the parameters given in the AV, the S-CSCF 10 authenticates the user and registers the corresponding IMPU. Implicitly registered IMPUs can be delivered by the HSS 20 to the S-CSCF 10.

After the setup of the security association indicated in FIG. 2, it can be assumed that all information relevant to a particular subscriber of the IMS is bound together during registration in the P-CSCF 10. In other words, the IP address of the UE1 40 or the UE2 60 is bound with the security parameters (e.g. the integrity key) of the respective UE in the P-CSCF 10.

When a SIP request message, e.g. an INVITE message is send from the UE1 40 to the P-CSCF 30 (step 1), the P-CSCF 30 performs an address comparison (step 2) in which an IP address or at least a part (e.g. a unique prefix) of the IP address, which is derived from a received IP datagram conveying the SIP message (if IPSec is used) or derived from a database (if SIPSec is used), is compared to an IP address indicated in a header, e.g. contact header or any other header portion, of the SIP message. As an example, the contact header of the SIP message is used to indicate the point of presence for the subscriber, i.e. the IP address of the UE1 40. This is the temporary point of contact for the subscriber which is being registered. Subsequent requests destined for the subscriber will be send to this address. Thus, this information is stored in the P-CSCF 30 and the S-CSCF 10.

Based on the result of the address comparison in step 2, the P-CSCF 30 makes a forwarding decision (step 3), e.g. whether the received message is to be forwarded to the S-CSCF 10, or not. If the compared IP addresses indicate the same location, e.g. are the same addresses, no fraudulent attack can be assumed, since the source address indicated in the SIP message corresponds to a "true" source address, i.e. the actual source address of the IP datagram or the IP address indicated by the SA parameters stored at the P-CSCF 30. In this case, the SIP message, e.g. SIP INVITE, is forwarded in step 4 to the S-CSCF 10. Then, the S-CSCF 10 checks in step 5, whether the IP address indicated in the header has been bound to the IMPU indicated in the From header of the SIP message.

Thus, in case of the fraudulent user attack initiated by the UE2 60, the IP addresses compared in step 2 do not indicate the same location, e.g. are not the same, and the forwarding decision in step 3 will initiate a protection processing so that the SIP request message received from the UE2 60 is not forwarded from the P-CSCF 30 to the S-CSCF 10, e.g. the SIP request message is dropped. Thereby, an efficient mechanism for preventing fraudulent user attacks can be provided.

Figure 3:
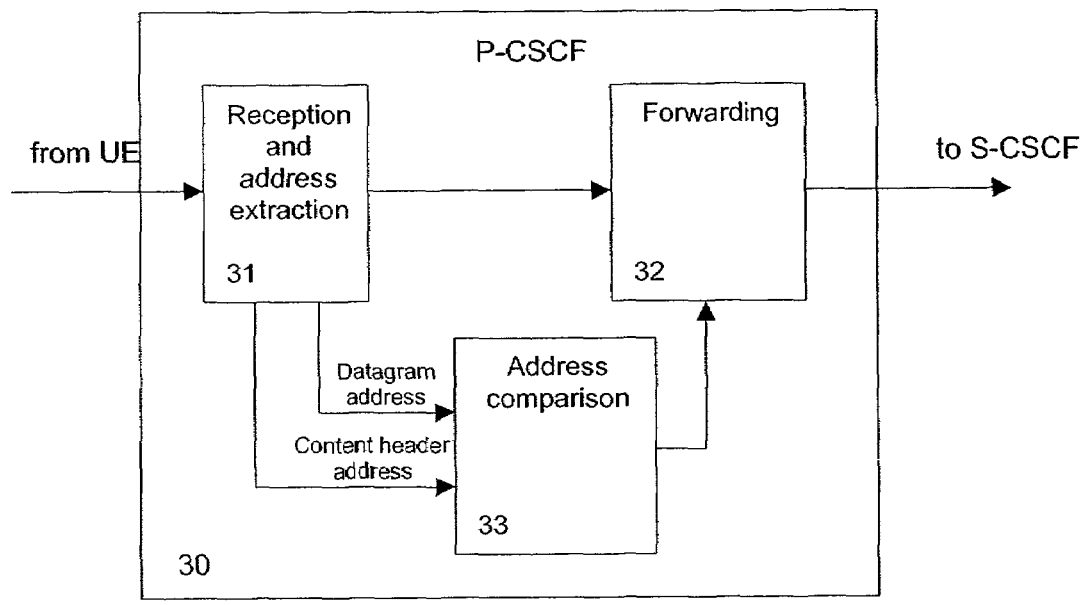
FIG. 3 shows a schematic functional block diagram of a proxy server according to the first preferred embodiment.

FIG. 3 shows a schematic functional block diagram of corresponding functionalities at the P-CSCF 30 according to the first preferred embodiment. In the first preferred embodiment, the address comparison is performed at an address comparison functionality 33 of the P-CSCF 30 by comparing the content header address of the SIP message with the datagram address of an IP datagram conveying the SIP message in the network layer. The addresses may be extracted at a reception and address extraction functionality 31 which receives the SIP message from the UE1 40 via an access network. The received SIP message is then supplied to a forwarding functionality 32 arranged to control the forwarding of the SIP message to the S-CSCF 10. The forwarding functionality 32 can be controlled by an output signal of the address comparison functionality 33 so as to suppress the forwarding of the SIP message if the compared datagram address and content header address indicate the same location, e.g. are the same addresses.

In the first preferred embodiment, it is assumed that the IPSec security protocol is used between the UA of the UE1 40 or the UE2 60 and the P-CSCF 30. When the UA sends a SIP request message, it has to use the correct SA. The use of IPSec can guarantee that the IP source address in the IP datagram is correct. Thereby, a fraudulent user attack by the UE2 60 using an IMPU of the UE1 40 can be prevented.

Figure 4:
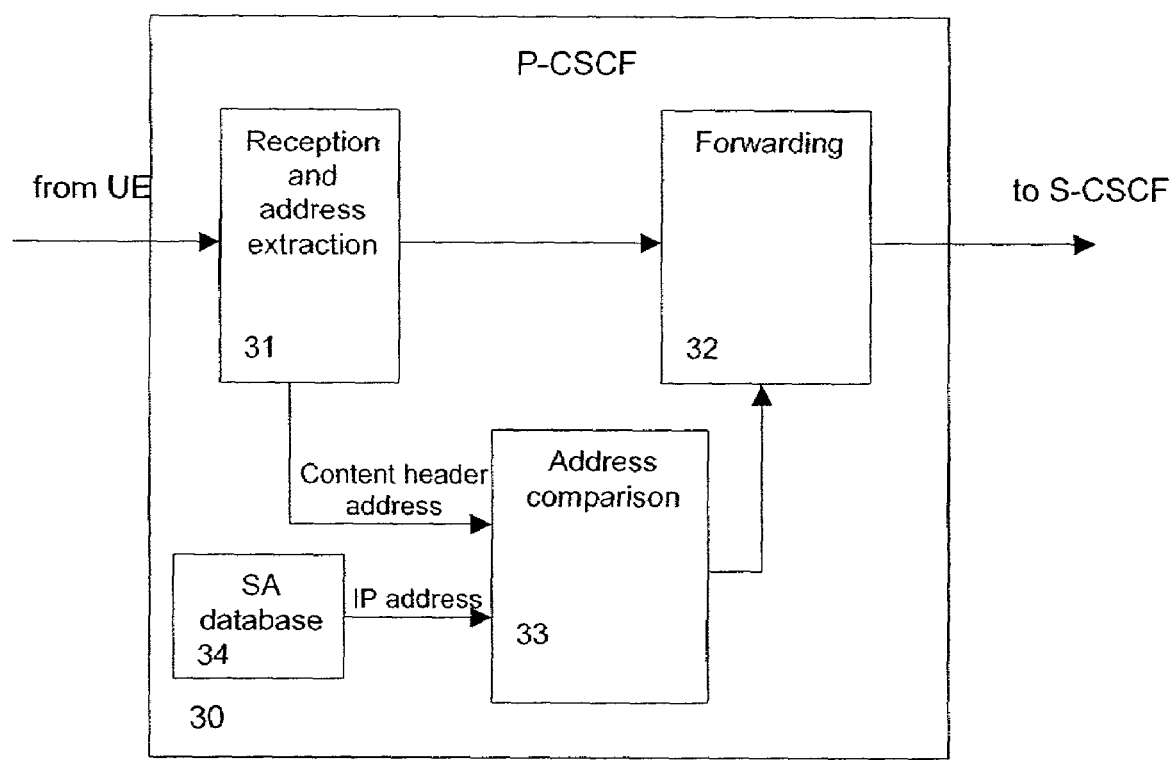
FIG. 4 shows a schematic functional block diagram of a proxy server according to the second preferred embodiment.

FIG. 4 shows a schematic functional diagram of corresponding functionalities of a P-CSCF 30 according to the second preferred embodiment. In the second preferred embodiment, it is assumed that the SIP-level protection (SIPSec) is used between the UA of the UE1 40 or the UE2 60 and the P-CSCF 30. When the UA sends a SIP request message, the SIPSec will provide the integrity protection for the entire SIP message. In the SIP message, the From header contains the IMPU and the header contains the IP address (i.e.

the IMPI) of the UE1 40 or the UE2 60. First, the P-CSCF 30 verifies the integrity checksum with a particular integrity key, e.g at the reception and address extraction functionality 31. Then, the header address is extracted at the reception and address extraction functionality 31 and supplied to the address comparison functionality 33. Contrary to the first preferred embodiment, the IP address or address part bound to the respective integrity key is read from an SA database 30 in which SA parameters are stored. Based on the result of the address comparison, a control signal is supplied to the forwarding functionality 32 so as to control whether to forward the SIP message, or not, similar to the first preferred embodiment.

It is noted that the functional blocks indicated in FIGS. 3 and 4 may be implemented as software routines controlling a processing element at a proxy server, e.g. the P-CSCF 30, or as discrete hardware circuits. Any other protection processing, e.g. a warning signaling or message marking functionality, can be controlled based on the result of the comparison functionality 33 in the first and second preferred embodiment. Furthermore, the present invention may be applied to any network element arranged for routing a message within the packet data network. The comparison function may be performed by using any suitable source information indicating the address or location of a terminal device. Thus, the preferred embodiments may vary within the scope of the attached claims.

The invention claimed is:

1. A method, comprising:
   receiving a message from a terminal device connected to a packet data network;
   deriving first source information from said message;
   deriving second source information;
   comparing said first source information and said second source information;
   initiating protection processing based on a result of said comparing; and
   providing secure access to said packet data network based on said protection processing.

2. The method according to claim 1, wherein said second source information comprises source address information derived from a packet data unit configured to convey said message, or from a security association set up between said terminal device and said packet data network.

3. The method according to claim 2, wherein said second source information comprises an internet protocol address bound to an integrity key of said security association.

4. The method according to claim 3, wherein said internet protocol address is stored in a database of a proxy server configured to route said message to said packet data network.

5. A method according to claim 3, wherein said message is conveyed using a session initiation protocol level protection function.

6. A method according to claim 1, wherein said protection processing comprises processing to drop said message when the result of said comparing is that said first source information and said second source information do not indicate the same location.

7. A method according to claim 1, wherein said protection processing comprises processing to drop said message when said comparing leads to the result that said first source information and said second source information do not match.

8. The method according to claim 1, wherein said first source information comprises an internet protocol address.

9. A method according to claim 8, wherein said message comprises a session initiation protocol message.

10. The method according to claim 1, wherein said second source information comprises at least a part of an internet protocol source address of an internet protocol datagram.

11. An apparatus, comprising:
    a receiving unit configured to receive a message from a terminal device connected to a network element;
    a deriving unit configured to derive first source information from said message, and to derive second source information;
    a comparing unit configured to compare said first source information and said second source information; and
    a protecting unit configured to initiate protection processing based on a comparing result of said comparing unit and to provide secure access to a packet data network based on said protection processing.

12. The apparatus according to claim 11, wherein said deriving unit is configured to derive said second source information from a packet data unit configured to derive said message or from a security association set up between said terminal device and said apparatus.

13. The apparatus according to claim 12, wherein said deriving unit is configured to derive said first source information from a header portion of said message.

14. The apparatus according to claim 12, wherein said protecting unit is configured to initiate processing to drop said message when said comparing result indicates that said first source information and said second source information do not indicate the same location.

15. The apparatus according to claim 12, wherein said protecting unit is configured to initiate processing to drop said message when said comparing result indicates that said first source information and said second source information do not match.

16. The apparatus according to claim 12, wherein said deriving unit is configured to read said second source information from a database provided at said apparatus.

17. The apparatus according to claim 12, wherein said deriving unit is configured to derive said second source information by extracting an internet protocol source address from an internet protocol datagram.

18. The apparatus according to claim 12, wherein said apparatus comprises a proxy server.

19. The apparatus according to claim 18, wherein said proxy server comprises a proxy call state control function of an internet protocol mobility subsystem.

20. The apparatus according to claim 11, wherein said deriving unit is configured to derive said first source information from a header portion of said message.

21. The apparatus according to claim 11, wherein said protecting unit is configured to initiate processing to drop said message when said comparing result indicates that said first source information and said second source information do not indicate a same location.

22. The apparatus according to claim 11, wherein said protecting unit is configured to initiate processing to drop said message when said comparing result indicates that said first source information and said second source information do not match.

23. The apparatus according to claim 11, wherein said deriving unit is configured to read said second source information from a database provided at said apparatus.

24. The apparatus according to claim 11, wherein said deriving unit is configured to derive said second source information by extracting an internet protocol source address from an internet protocol datagram.

25. The apparatus according to claim 11, wherein said apparatus comprises a proxy server.

26. The apparatus according to claim 25, wherein said proxy server comprises a proxy call state control function of an internet protocol mobility subsystem.

27. An apparatus, comprising:
receiving means for receiving a message from a terminal device connected to a network element;
deriving means for deriving first source information from said message, and for deriving second source information;
comparing means for comparing said first source information and said second source information; and
protecting means for initiating protection processing based on a comparing result of said comparing means and for providing secure access to a packet data network based on said protection processing.

28. A computer program embodied on a computer-readable storage medium, the computer program configured to control a processor to perform operations comprising:
receiving a message from a terminal device connected to a packet data network;
deriving first source information from said message;
deriving second source information;
comparing said first source information and said second source information;
initiating protection processing based on a result of said comparing; and
providing secure access to said packet data network based on said protection processing.

* * * * *

UNITED STATES PATENT AND TRADEMARK OFFICE
CERTIFICATE OF CORRECTION

PATENT NO.       : 7,574,735 B2
APPLICATION NO. : 10/073216
DATED            : August 11, 2009
INVENTOR(S)      : Pirttimaa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2086 days.

Signed and Sealed this

Seventh Day of September, 2010

David J. Kappos
*Director of the United States Patent and Trademark Office*